United States Patent [19]
Sugikawa

[11] Patent Number: 5,850,591
[45] Date of Patent: Dec. 15, 1998

[54] METHOD OF MANUFACTURING A METAL SHEET

[75] Inventor: Hirofumi Sugikawa, Toyonaka, Japan

[73] Assignee: Katayama Special Industries, Ltd., Osaka-fu, Japan

[21] Appl. No.: 837,457

[22] Filed: Apr. 18, 1997

[30] Foreign Application Priority Data

Apr. 19, 1996 [JP] Japan .................................. 8-122534

[51] Int. Cl.⁶ .................................. B22F 3/18; B22F 7/04
[52] U.S. Cl. .............................. 428/553; 75/228; 75/230; 75/232; 419/2; 419/3; 419/8; 419/10; 419/19; 419/28; 419/29; 419/43; 419/53; 419/54; 419/55
[58] Field of Search .................................. 419/2, 3, 8, 10, 419/19, 28, 29, 43, 53, 54, 55; 75/228, 230, 232; 264/56, 63; 428/553

[56] References Cited

U.S. PATENT DOCUMENTS

| | | | |
|---|---|---|---|
| 2,222,251 | 11/1940 | Calkins et al. | 29/149.5 |
| 2,689,178 | 9/1954 | Hignett | 75/208 |
| 2,979,400 | 4/1961 | Mouwen | 75/222 |
| 3,002,834 | 10/1961 | Pasquale | 75/208 |
| 3,390,968 | 7/1968 | Brown | 29/183.5 |
| 3,422,515 | 1/1969 | Klein | 29/25.41 |
| 3,431,105 | 3/1969 | Heck | 75/208 |
| 4,059,879 | 11/1977 | Chmura | 29/148.4 R |
| 4,108,651 | 8/1978 | Tapley | 75/208 CS |
| 4,654,195 | 3/1987 | Wnuck et al. | 419/2 |
| 4,769,211 | 9/1988 | Langner | 419/3 |
| 4,820,481 | 4/1989 | Wolff et al. | 419/3 |
| 5,496,650 | 3/1996 | Sugikawa | 428/548 |

FOREIGN PATENT DOCUMENTS

| | | |
|---|---|---|
| 0657950A | 6/1995 | European Pat. Off. |
| 1320812A | 6/1963 | France |
| 1375438A | 11/1974 | United Kingdom |

Primary Examiner—Daniel J. Jenkins
Attorney, Agent, or Firm—Sughrue, Mion, Zinn, Macpeak & Seas, PLLC

[57] ABSTRACT

A method of manufacturing a porous metal sheet having pores forming a pattern, comprising the steps of supplying metal powders to a peripheral surface, of at least one pattern roller of a pair of rollers, on which a pattern including a large number of concaves is formed; dropping metal powders to the concaves and accumulating metal powders on the peripheral surface of the pattern roller except the concaves; and rolling directly the metal powders accumulated on the peripheral surface of the pattern roller by rotating a pair of the rollers. It is preferable to laminate porous metal sheets or solid metal sheets manufactured by a method other than the above-described method on the metal sheet manufactured by the above-described method.

20 Claims, 10 Drawing Sheets

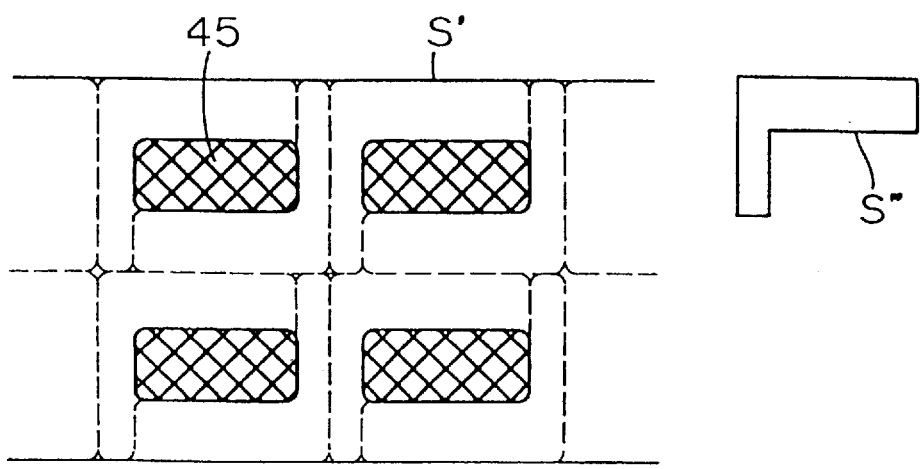

METHOD OF MANUFACTURING A METAL SHEET

BACKGROUND OF THE INVENTION

1. Field of the Invention

The present invention relates to a method of manufacturing a metal sheet; a metal sheet manufactured by the method; and a battery comprising an electrode substrate composed of the metal sheet. The metal sheet has a large number of pores forming a pattern and/or solid metal portions having no pore and a required shape, thus being preferably used as electrode plates or component parts of a battery. It is necessary to manufacture pores forming a pattern and/or solid metal portions having no pore and a required shape without wasting metal materials.

2. Description of the Related Art

Conventionally, as the electrode substrate comprising a positive plate and a negative plate of a nickel/hydrogen battery, a nickel/cadmium battery or the like, principally, a nickel-plated perforated steel plate (hereinafter referred to as punching metal) which has pores formed on nickel-plated steel plate by punching is used. The punching metal is charged with an active substance to form the electrode plate. The electrode plate of a cylindrical battery accommodates belt-shaped positive and negative electrodes wound spirally through a separator. The electrode plate of a rectangular or square battery accommodates positive and negative electrodes layered on each other through a separator.

With respect to the punching metal, a cold-drawn steel plate having a thickness of 60 $\mu$m–100 $\mu$m is punched to form circular pores of 1.0 mm–2.5 mm in a required pattern on the steel plate such that the open area ratio thereof is 40%–50%. The steel plate is then nickel-plated to maintain resistance to corrosion. In this manner, the punching metal thus formed is used as the electrode substrate of the battery.

As the electrode substrate consisting of positive and negative plates of a lithium primary battery, mainly, a metal plate (SUS, Ti) is used. The metal sheet is processed into a lath to which an active substance is applied to form an electrode plate. In a lithium secondary battery, an active substance is applied in a required thickness to both surfaces of a core material made of an aluminum foil to form a positive plate, while an active substance is applied to both surfaces of a core material made of a copper foil to form a negative plate.

As the substrate of an air electrode to be used as the positive electrode of an air zinc battery, mainly, a metal screen (nickel-plated SUS mesh or the like) is used. An active substance is applied to the metal screen to form the electrode plate of the battery. In a lead storage battery which is used as a car battery and attracting public attention, cast lattice or expanded lattice consisting of lead alloy (Pb/Sb alloy, Pb/Ca alloy, Pb/Ca/Sn alloy or the like) is used. An active substance is applied to the lattice to form the electrode plate of the storage battery.

Further, in recent years, as the electrode substrate of the nickel/hydrogen battery, the nickel/cadmium battery, and the lithium primary battery, porous metal sheets are used. The porous metal sheets are formed as follows: Foamed material made of resin, nonwoven sheets made of resin or mesh sheets made of resin are chemically plated to make them electrically conductive, and electroplated. Then, they are baked for resin removal and sintering.

The punching metal formed by forming pores on the metal plate to use it as the electrode substrate of the nickel hydrogen battery or the like has the following disadvantages:

1) Because pore-making processing is carried out by pressing, the portion corresponding to pores are cut out from the metal plate. Thus, a large quantity of a material is wasted. For example, supposing that an open area ratio of the punching metal is 50%, half of the material is wasted, which leads to the production of expensive electrode substrates.

2) Pressing cost required to make pores on the metal plate is high.

3) Because pores are made on the metal plate two-dimensionally, the open area ratio thereof is not more than 50%, which means that there is a limitation in the charge amount of an active substance.

4) In order to increase the capacity of a battery, it is preferable to use a thin substrate and having a large open area ratio so as to increase the charge amount of an active substance. But for the above-described reason, there is a limitation in the open area ratio. When the thickness of the metal plate is made to be smaller from 60–80 $\mu$m adopted currently to less than 60 $\mu$m, the material cost is high and moreover, the metal plate is plated with a low efficiency. Thus, the processing cost becomes high. Further, when the metal plate is thin, it is likely that the metal plate is strained or a burr is formed thereon when pores are formed by press-cut.

In a lath processed from a metal plate to use it as the electrode substrate of the lithium primary battery, the metal plate is strained and warped by stress which has concentrated locally when it is processed into the lath, thus becoming uneven. The lath, without cutting for lower costs, is corrected for strain and warp by means of a leveler and an active substance is applied thereto before it is cut to a standard size. When the lath is cut, the strain which occurred in processing the metal plate into the lath is regenerated and burrs are liable to be generated. Therefore, when the lath is coiled through a separator, a leak is likely to occur due to the burr and the strain. It is preferable that in the lithium primary battery, the electrode substrate has a possible largest open area ratio so that it has a high strength. The lath currently used has an open area ratio of 63% at maximum in consideration of its structure. The processing cost increases as the open area ratio becomes greater.

Because pores are formed on a metal screen, cast lattice, and expanded lattice to be used as the substrate of an air zinc battery or a lead storage battery, there is a limitation in the open area ratio thereof because the open area are formed in two-dimensions and further, the material cost is increasingly high as the thickness thereof is smaller. In addition, the metal screen is plated with a low efficiency. Thus, the processing cost becomes high. The expanded lattice has problems similar to those of the punching metal or the lath.

The porous metal sheet developed to replace the punching metal and the lath is formed by plating a base material made of resin and baking the plated base material to remove resin and sintering to provide a great open area ratio. Thus a greater amount of an active substance can be applied to the porous metal sheet. But the porous metal sheet has a lower tensile strength than the punching metal. Therefore, in applying the active substance to the porous metal sheet while it is being pulled on an applying line, the line cannot be operated at a high speed. That is, the porous metal sheet cannot be produced at a high efficiency. Further, to plate the base material made of resin having no electric conductivity, it is indispensable to impart electric conductivity thereto as a primary processing by carrying out such as chemical plating which is performed in a complicated process. Even after the base material of the porous metal sheet is allowed to be electrically conductive, it does not have a favorable electric conductivity. Thus, the porous metal sheet is manufactured at a high cost due to a low productivity in electroplating the base material and the consumption of a great electric power.

The aluminum foil and the copper foil are used as the electrode substrate of the lithium secondary battery. While the solid metal foil made of the aluminum foil and the copper foil is being pulled, an active substance is applied to both surfaces thereof in the same thickness. Because the foil has a low strength, it cannot be pulled at a high speed and further, it is not easy to apply the active substance in the same thickness to the upper and lower surfaces of the foil. When the active substance is applied nonuniformly to the foil, a part thereof is not active in discharge and charge times. Hence, the active substance cannot be utilized with a high efficiency in a battery case.

The conditions required for the electrode substrate are as described below. The conventional electrode substrates do not satisfy all of the conditions.

(a) The substrate has a high electric conductivity. That is, the substrate is required to have a smooth electricity-collecting action, with a low internal resistance set.

(b) The substrate has a high open area ratio. That is, it allows a large amount of an active substance to be applied thereto, thus increasing the capacity of a battery.

Even though it has a high open area ratio and thus allows a large amount of the active substance to be applied thereto, a electricity-collecting action cannot be accomplished smoothly if the area of contact between the active substance and metal is small. Therefore, the substrate is required to have a high open area ratio and the area of contact between the active substance and metal is large.

(c) The substrate is thin and has a high tensile force. That is, if the substrate is thin, it can be accommodated in a battery case in a large amount, thus enhancing the capability of the battery. If the substrate is thin, its tensile force becomes low. Consequently, the pulling speed of the substrate is slow in applying the active substance thereto, which results in a low productivity. Accordingly, the substrate is thin and has a high tensile force.

(d) The substrate has an electricity-collecting lead and can be processed into a required shape at a low cost.

SUMMARY OF THE INVENTION

The present invention has been made in view of the above-described problems. It is accordingly an object of the present invention to satisfy the above-described demand. It is another object of the present invention to provide a method of manufacturing a thin metal sheet having a high electrical conductivity and having a high open area ratio provided without wasting material so as to improve the capability of a battery by a fewer number of manufacturing processes and at a low cost. It is a further object of the present invention to provide a solid metal sheet (without pores) with a required shape and which is used as component parts of the battery.

In order to solve the above-described problems, there is proposed a method of manufacturing a porous metal sheet having pores forming a pattern, comprising the steps of supplying metal powders to a peripheral surface, of at least a pattern roller of a pair of rollers, on which a pattern consisting of a large number of concaves is formed; dropping metal powders to the concaves and accumulating metal powders on the peripheral surface of method eliminates the need for the provision of a punching process or a plating manufacturing process. Because metal powders can be compressed and rolled by the rollers, they can be integrated into each other at a temperature lower than the melting point of a metal even though the melting point of the metal is high, and metal powders of different kinds can be mixed with each other.

Further, there is provided a method of manufacturing a porous metal sheet having a metal solid portion having no pore and a required shape, comprising the steps of supplying metal powders to a peripheral surface, of at least of a pattern roller of a pair of rollers, on which a pattern consisting of a large number of concaves is formed on a portion except a continuous portion corresponding to a required shape dropping metal powders to the concaves and accumulating metal powders on the peripheral surface of the pattern roller except the concaves; and rolling directly the metal powders accumulated on the peripheral surface of the pattern roller by rotating a pair of the rollers.

As described above, because the concaves are formed on the portion of the pattern roller other than the continuous portion of the required shape, a metal sheet having solid portions can be continuously formed thereon. In this manner, the metal sheet consisting of the solid portions having the required shape can be obtained without the pattern roller except the concaves; and rolling directly the metal powders accumulated on the peripheral surface of the pattern roller by rotating a pair of the rollers.

According to the above-described method, when metal powders are supplied to the surface of the pattern roller having the concaves formed thereon, metal powders drop to the concaves of the peripheral surface of the pattern roller and the concave-unprovided portion thereof. The metal powders which have dropped to the concaves are not rolled, but those which have dropped to the concave-unprovided portion of the peripheral surface of the pattern roller are accumulated in a certain thickness. When a pair of the rollers is rotated in this state, the metal powders which have dropped to the concave-unprovided portion of the pattern roller are directly rolled between the rollers, while the metal powders which have dropped to the concaves can be collected. Therefore, the metal powders corresponding to pores to be formed on the metal sheet are not wasted but can be recycled. Further, the thickness of the layer of metal powders can be adjusted by adjusting the amount of metal powders to be supplied to the surface of the pattern roller. In this manner, the thickness of the metal sheet to be manufactured can be easily adjusted to as small as about 30 $\mu$m. The method of the present invention allows the metal sheet to be manufactured in a simple process. That is, the wasting material.

In the manufacturing method , the pattern roller may be heated to roll metal powders . When powders of Au, Ag, Sn, Pb, In or C are used, it is not necessary to heat the pattern roller.

It is possible to roll metal powders by a pair of flat rollers each having a smooth peripheral surface again after the metal powders are rolled by a pair of the rollers including the pattern roller. The pair of the flat rollers may be heated.

That is, metal powders may be rolled again by a pair of the flat rollers having the normal room temperature or heated to a certain temperature after they are rolled by a pair of the rollers including the pattern roller having the normal room temperature or heated to a certain temperature. It depends on the kind of metal powders which are used whether metal powders are rolled at the normal room temperature or at a temperature higher than the normal room temperature, and whether they are rolled again by a pair of the flat rollers after they are rolled by a pair of the rollers including the pattern roller. Preferably, a pair of the rollers including the pattern roller and a pair of the flat rollers are heated to 300° C.–400° C. The air in the periphery thereof may be heated to heat them.

After the metal powders are rolled by a pair of the rollers including the pattern roller or a pair of the flat rollers, the metal powders may be sintered. Metal powders are sintered in a nonoxidizing atmosphere at a temperature, for example, higher than 1000° C. for about 15 minutes. It is possible to sinter and roll the metal powders by a pair of the flat rollers appropriately and repeatedly as desired, and regardless of order after the metal powders are compressed by a pair of the rollers including the pattern roller.

Preferably, metal powders are temper-rolled after the metal powders are rolled by a pair of the rollers including the pattern or a pair of the flat rollers or after the metal powders are sintered. It is preferable to roll the metal powders into a metal sheet having a thickness of 2–500 μm by means of a pair of tempering rollers.

The metal powders are supplied to the pattern roller by spreading them from above the pattern roller. A knife installed alongside the pattern roller adjusts the thickness of the metal powders to a required one. For spreading the metal powders, a sieve installed above the pattern roller is vibrated to spread the metal powders to the upper surface of the pattern roller. Instead, an inclined belt is provided above the pattern roller to feed the metal powders to the pattern roller, with a scraping knife provided at the lower end of the belt for scraping the metal powders.

As another method of supplying the metal powders to the pattern roller, the metal powders are supplied to a steel belt. The belt is fed to the gap between a pair of the rollers. The metal powders supplied to the concave-unprovided portion of the pattern roller are compressed in cooperation with the pattern roller and the flat roller. It is possible to supply paste-like metal powders to the belt and feed it to the pattern roller, and convey to a pair of the rollers after the paste-like metal powders are dried and greased.

According to another aspect of the present invention, a method of manufacturing a porous metal sheet, comprising the steps of layering, on at least one surface of a metal sheet manufactured by the method according to any one of above mentioned methods, one or more of the metal sheet manufactured by the method according to any one of above-mentioned methods, a different kind of porous metal sheet, a different kind of solid metal sheet or solid metal foil having no pore, a metal sheet or a metal foil each having a large number of pores formed thereon, a metal mesh sheet, a metal screen, a three-dimensional reticulate foamed sheet, a porous fibrous resin sheet or a porous fibrous mesh sheet or two or more kinds of the sheets; and integrating the sheets by plating, evaporating the sheets layered on the metal sheet or bonding the sheets to each other.

That is, a metal sheet manufactured by the method of the present invention is layered on one or both surfaces of a metal sheet manufactured by supplying metal powders to a pair of the rollers including the pattern roller. Otherwise, a metal sheet or a metal foil each having a large number of pores formed thereon is layered on one or both surfaces of the metal sheet manufactured by using the said pattern roller. The sheet consisting of the sheets layered on each other is electroplated to integrate them with each other. Further, a three-dimensional reticulate foamed sheet, a porous fibrous resin sheet such as a nonwoven sheet or a mesh sheet layered on the metal sheet manufactured by the pattern roller is electroplated to allow the foamed sheet, the nonwoven sheet or the mesh sheet to be a porous metal sheet and simultaneously integrate the porous metal sheet and the metal sheet manufactured by the pattern roller with each other. In this manner, the metal sheet having a layered structure is manufactured.

Further, there is provided a metal sheet manufactured by the method described in any one of the above mentioned methods, and a metal sheet of an electrode substrate of a battery is manufactured by the method described. The metal sheet manufactured by the above method can be allowed to have a thickness of 2–500 μm and favorably, 10–60 μm. The open area ratio of the porous metal sheet can be adjusted to 10–99% by adjusting the area of the concaves to be formed on the pattern roller. When the porous metal sheet is used as an electrode substrate of a battery, the open area ratio thereof can be increased to 99% for increasing the application amount of an active substance.

Metal powder constituting the metal sheet consists of Ni, Al, Cu, Fe, Ag, Zn, Sn, Pb, Sb, Ti, In, V, Cr, Co, C, Ca, Mo, Au, P, W, Rh, the oxide thereof, the sulfide thereof, a compound of any one of the metals or a mixture of the metals.

The size of the metal powders is 100 μm–0.1 μm. The shape of the metal powders are spike-shape, filament-shape, sphere-shape, flake-shape, branch-shape or the like. As the electrode substrate of a lithium battery, metal powders containing the spike-shaped ones and branch-shaped ones or the like mixed with each other can be preferably used.

The pores of the metal sheet can form any desired pattern by forming concaves of a desired shape on the pattern roller. For example, the shape of the pores of the metal sheet can be punched pore-shaped, reticulate, honeycomb-shaped, lath-shaped, lattice-shaped, expanded-shaped, screen-shaped or lace-shaped.

The metal sheet may have a lead portion in which pores are not formed at regular intervals.

The metal sheet of the present invention consists of a porous metal sheet by layering, on at least one surface of a metal sheet described in any one of the said methods, the metal sheet manufactured by using the pattern roller, a solid metal sheet, a solid metal foil, a metal sheet or a metal foil each having a large number of pores formed thereon, metal mesh sheet, a metal screen, a three-dimensional reticulate foamed sheet, a porous fibrous resin sheet, a mesh sheet, and/or a porous metal sheet which is manufactured by baking the sheet to remove resin and sintering after plating, evaporating, coating fine metal powders or spray-coating melted metal a three-dimensional reticulated foamed sheet, a porous fibrous resin sheet, a mesh sheet, a sheet composed by layering those sheets on each other or two or more kinds of those sheets.

Further, a three-dimensional reticulate porous metal sheet or a porous fibrous metal sheet is layered on both surfaces of the metal sheet described in any one of the said methods; the metal sheet manufactured by using the pattern roller is sandwiched between the two three-dimensional reticulate porous metal sheets or between the two porous fibrous metal sheets; and a diameter of a pore or an open area ratio of the two three-dimensional reticulate porous metal sheets, and a diameter of a metal fiber and an open area ratio of the two porous fibrous metal sheets layered on both surfaces of the metal sheet are different each other. In the above layered metal sheet, the strength and pulling strength of the outer side thereof is differentiated from the inner side thereof. When an active substance-applied porous metal sheet having such a layered structure is used as an electrode plate of a battery, the metal is provided in the battery in such a manner that the side thereof having a higher pulling strength is positioned at the outer side in coiling it spirally in the battery. In such an electrode plate, the metal sheet can be prevented from being cracked easily.

Further, there is proposed a battery in which the metal sheet manufactured by any one of the said methods is used as an electrode substrate.

Further more, there is provided a roller having a pattern roller having concaves formed thereon and used in the manufacturing method as above described.

That is, when a pair of the rollers having the pattern roller in the above described is used, the porous metal sheet can be manufactured easily, and the porous metal sheet providing a solid portion having a required shape by cutting the metal sheet can be manufactured.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 10 (B) is a plan view showing a metal sheet manufactured in the third embodiment of the present invention;

FIG. 10 (C) is a plan view showing a solid metal sheet formed by cutting unrequited portion;

FIG. 11 is a plan view showing a modification of the third embodiment of the present invention;

DESCRIPTION OF THE PREFERRED EMBODIMENTS

The embodiments of the present invention will be described below with reference to drawings.

FIGS. 1 through 5 show the first embodiment of the present invention. In the first embodiment, a metal sheet of a single layer having circular pores formed thereon in a pattern is manufactured. The circular pores are formed not by punching but by the method according to the present invention which will be described below.

Figure 1:
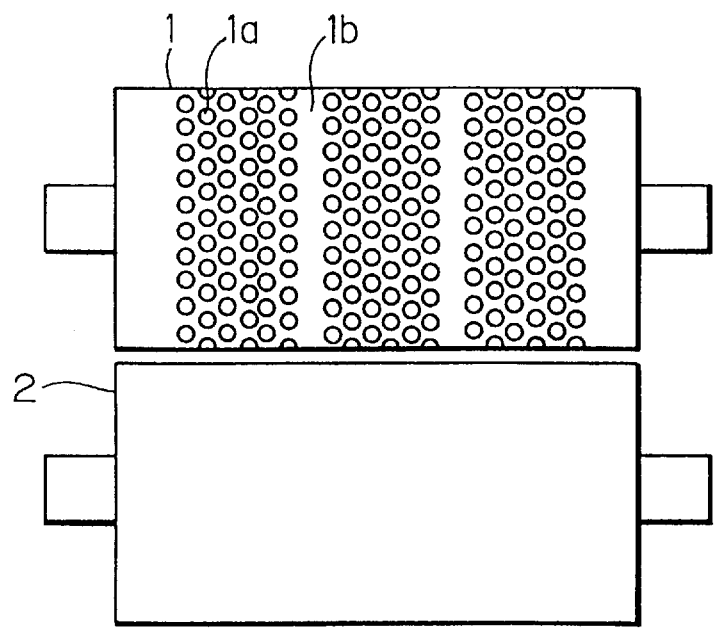
FIG. 1 is a front view showing a pair of rollers to be used in a first embodiment of the present invention.
Figure 2:
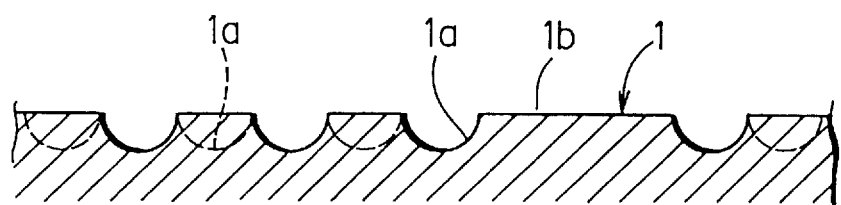
FIG. 2 is a main portion-depicted view showing the pattern roller of a pair of the rollers shown in FIG. 1.
Figure 5:
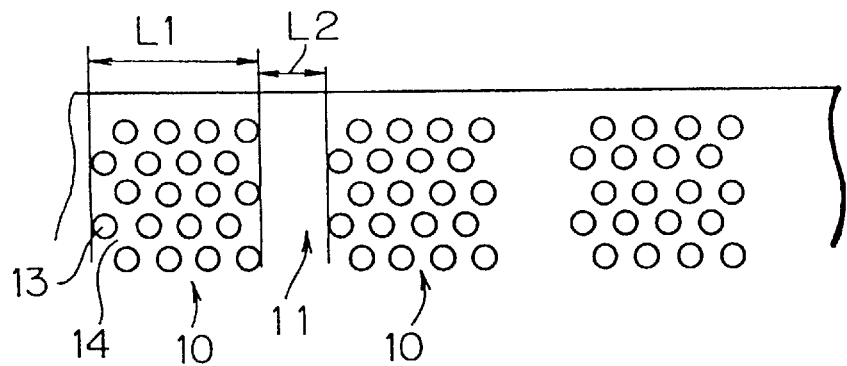
FIG. 5 is a plan view showing a metal sheet formed by compressing metal powders according to the first embodiment of the present invention.

FIG. 1 shows a pair of pressure rollers, namely, a pattern roller 1 and a flat roller 2. As shown in FIGS. 1 and 2, the pattern roller 1 has, on its peripheral surface, a plurality of hemispherical concaves 1a formed lengthwise and widthwise at regular intervals and each having a predetermined diameter. The flat roller 2 has a smooth surface. Portions each having a predetermined width L1 having the concaves 1a formed thereon are spaced at regular intervals of L2. As shown in FIG. 5, the pattern roller 1 comprises the portions each having the width L1 for forming porous sheet sections 10 and the portions each having the width L2 for forming lead sections 11 consisting of a solid portion. Although the concaves 1a are not formed on the flat roller 2, concaves may be formed thereon. In the first embodiment, the diameter and the length of the effective surface of each of the pattern roller 1 and the flat roller 2 are 150 mm and 100 mm, respectively.

Figure 3:
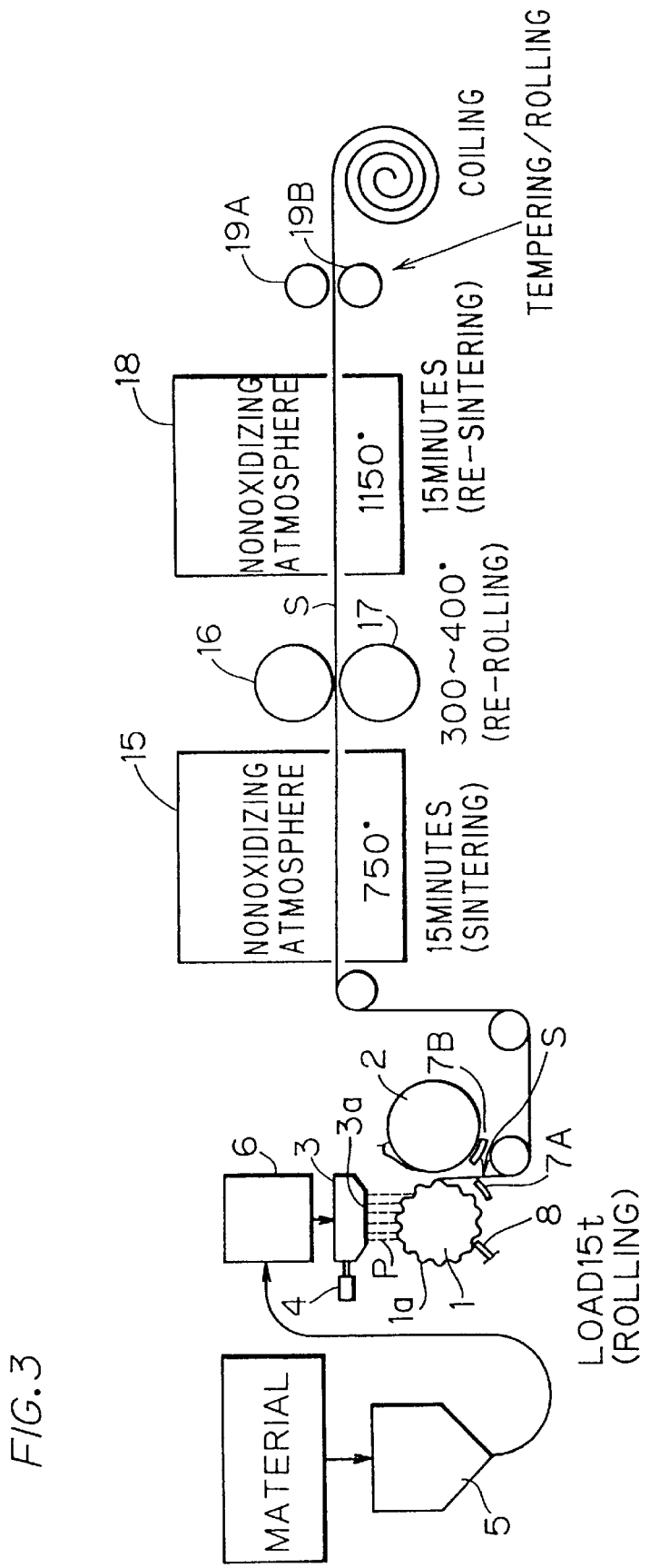
FIG. 3 is a schematic view showing an apparatus for carrying out the method of the first embodiment.

As shown in FIG. 3, a vibrating device 4 vibrates a sieve 3 supported thereby and positioned above the pattern roller 1, in a left-and-right direction, having a mesh portion 3a formed on the bottom surface thereof. Metal powders (P) are spread over the upper surface of the pattern roller 1 by sieving them. A predetermined amount of metal powders (P) is supplied to the sieve 3 from a hopper 5 through a feeder 6 which feeds a predetermined quantity of the metal powders (P) per unit time period. Knives 7A and 7B are provided below a portion (A) of contact between the pattern roller 1 and the flat roller 2, with the knives 7A and 7B in contact with the peripheral surface of the pattern roller 1 and the flat roller 2, respectively. A suction device 8 for sucking metal powders which have remained on the peripheral surface of the pattern roller 1 is provided below the pattern roller 1 at the downstream side in the rotational direction of the pattern roller 1.

Figure 4:
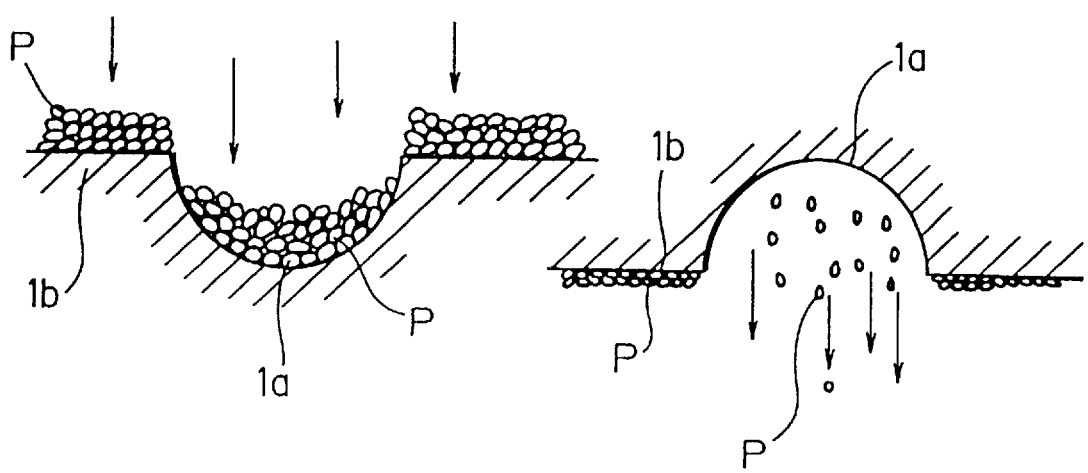
FIGS. 4 (A) and (B) are main portion-depicted views showing the operation of the first embodiment.

In the first embodiment, nickel powders in the shape of a spike and having diameters 2–7 μm are spread directly to the upper surface of the pattern roller 1 in the order of the hopper 5, the feeder 6, and the sieve 3. As shown in FIG. 4 (A), the metal powders (P) which have dropped to the concaves 1a are prevented from being accumulated to the level of the peripheral surface 1b of the pattern roller 1, i.e., they do not project from the peripheral surface 1b. The metal powders (P) accumulate to a predetermined thickness on the peripheral surface 1b to form a layer having the predetermined thickness.

Upon rotation of the pattern roller 1 and the flat roller 2 in this state, at the portion of contact (A) between the pattern roller 1 and the flat roller 2, the metal powders (P) on the peripheral surface 1b of the pattern roller 1 are compressed by the flat roller 2 at a load of 15 tons, thus being rolled as a thin compressed metal sheet (S). As shown in FIG. 4 (B), because the metal powders (P) accommodated inside the concaves 1a do not project from the peripheral surface 1b of the pattern roller 1, they are not compressed by the flat roller 2. With the rotation of the pattern roller 1, they pass the contact point (A), thus dropping from the concaves 1a when the concaves 1a turn downward. With the continuous rotation of the pattern roller 1 and the flat roller 2, the compressed metal sheet (S) thus formed at the contact point (A) becomes out of contact with the peripheral surface 1b of the pattern roller 1 and that of the flat roller 2, thus being fed downstream, as shown in FIG. 3. If the compressed metal sheet (S) has attached to the peripheral surface 1b of the pattern roller 1 or that of the flat roller 2, the knife 7A or the knife 7B releases it therefrom.

The metal powders (P) accommodated inside the concaves 1a fall owing to their own weight caused by the rotation of the pattern roller 1. If they have remained in the concaves 1a, the suction device 8 sucks them. The metal powders (P) which have dropped from the concaves 1a and been sucked to the suction device 8 are returned to the hopper 5 and recycled so that the metal powders (P) are not wasted.

The metal powders (P) are rolled by the pattern roller 1 and the flat roller 2 at the normal room temperature. As shown in FIG. 5, the compressed metal sheet (S) formed by rolling the metal powders (P) and fed downstream from the contact point (A) comprises the porous sheet sections 10 corresponding to the portions of the pattern roller 1 having the width L1; and the belt-shaped lead sections 11 consisting of solid portion and corresponding to the portions of the pattern roller 1 having the width L2. Each of the porous sheet sections 10 comprises pores 13 corresponding to the concaves 1a of the pattern roller 1; and a portion 14 corresponding to the peripheral surface 1b of the pattern roller 1 and surrounding the pores 13.

As shown in FIG. 3, the metal sheet (S) comprising the porous sheet sections 10 and the lead sections 11 alternating with each other is continuously fed into a sintering oven 15 in which it is sintered in a nonoxidizing atmosphere at 750° C. for about 15 minutes. In the first embodiment, the metal sheet (S) was contracted by 1–2% as a result of the sintering.

After the metal sheet (S) is sintered, it is rolled as follows: It is passed through a pair of flat rollers 16 and 17 heated to 300° C.–400° C. by applying a load of 5 tons thereto to roll it again. Then, the metal sheet (S) is continuously fed into a sintering oven 18 to sinter it again in a nonoxidizing atmosphere at 1,150° C. for about 15 minutes, with the result that it was contracted by 0.1%–0.2%.

After the metal sheet (S) is sintered in the sintering oven 18, it is passed between a pair of tempering rollers 19A and 19B to adjust the thickness of the metal sheet (S) to a predetermined thickness. Then, the metal sheet (S) is wound around a roller as a coil (C).

The porous metal sheet which is preferably used as the electrode substrate of a battery is manufactured by the above-described process. The metal sheet of the first embodiment has a thickness of 30 $\mu$m and an open area ratio of 57%.

Figure 6A:
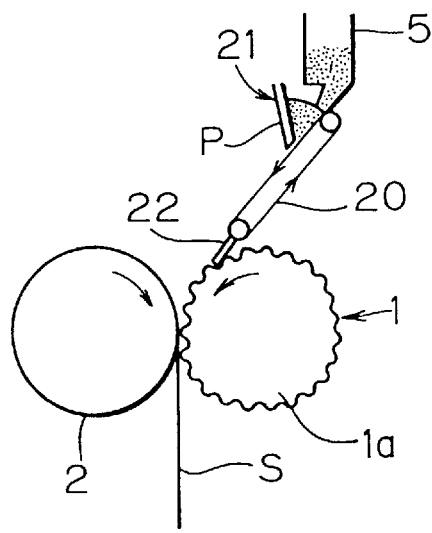
FIGS. 6 (A) through 6 (C) are schematic views showing modifications of the first embodiment of the present invention.
Figure 6B:
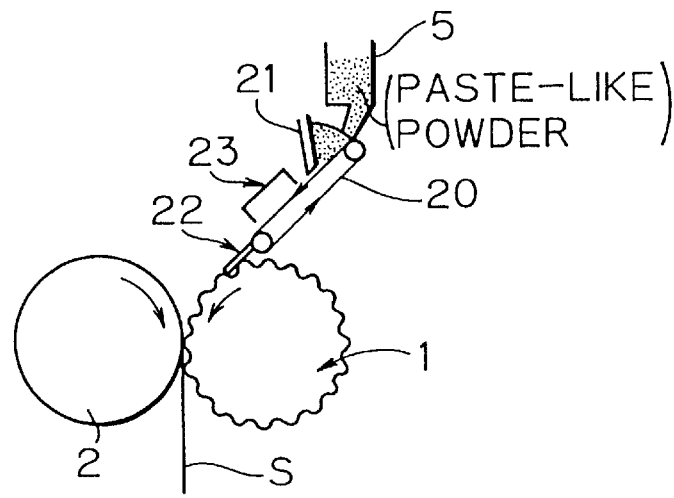
Figure 6C:
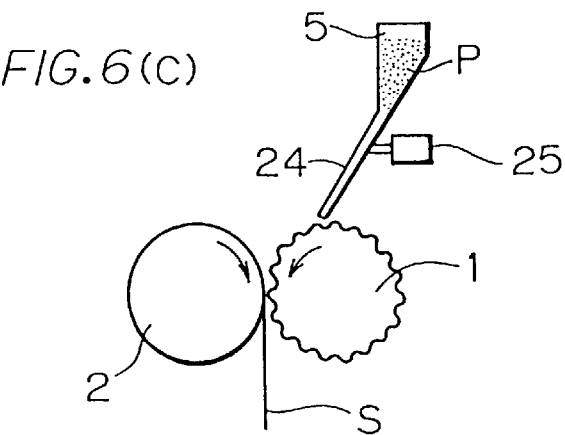

In the first embodiment, the metal powders (P) are spread directly over the pattern roller 1 from the sieve 3. But the following method may be adopted: As shown in FIG. 6 (A), an inclined belt 20, a doctor knife 21, and a scraping knife 22 are provided. That is, the belt 20 is provided above the pattern roller 1 so as to supply the metal powders (P) from the hopper 5 to the belt 20. A predetermined amount of the metal powders (P) is supplied to the pattern roller 1 through the doctor knife 21 provided at an upper position of the belt 20 such that it is positioned alongside the belt 20. The scraping knife 22 provided at the lower end of the belt 20 such that it is positioned alongside the belt 20 is used to supply the metal powders (P) from the belt 20 to the upper surface of the pattern roller 1.

Further, as shown in FIG. 6 (B), similarly to the manner shown in FIG. 6 (A), it is possible to mix organic adhesive agent with the metal powders (P) in the hopper 5 to form paste and supply it to the belt 20; supply a predetermined amount of the metal powders (P) to the pattern roller 1 through the doctor knife 21; dry and degrease the paste by means of a drying means 23 installed at an intermediate position of the belt 20; and supply it to the upper surface of the pattern roller 1 through the scraping knife 22.

Further, as shown in FIG. 6 (C), a conduit 24 may be connected with the take-out opening of the hopper 5 at the lower end thereof. The conduit 24 is vibrated by a vibration means 25 to supply the metal powders (P) from the take-out opening of the hopper 5 to the upper surface of the pattern roller 1.

Figure 7:
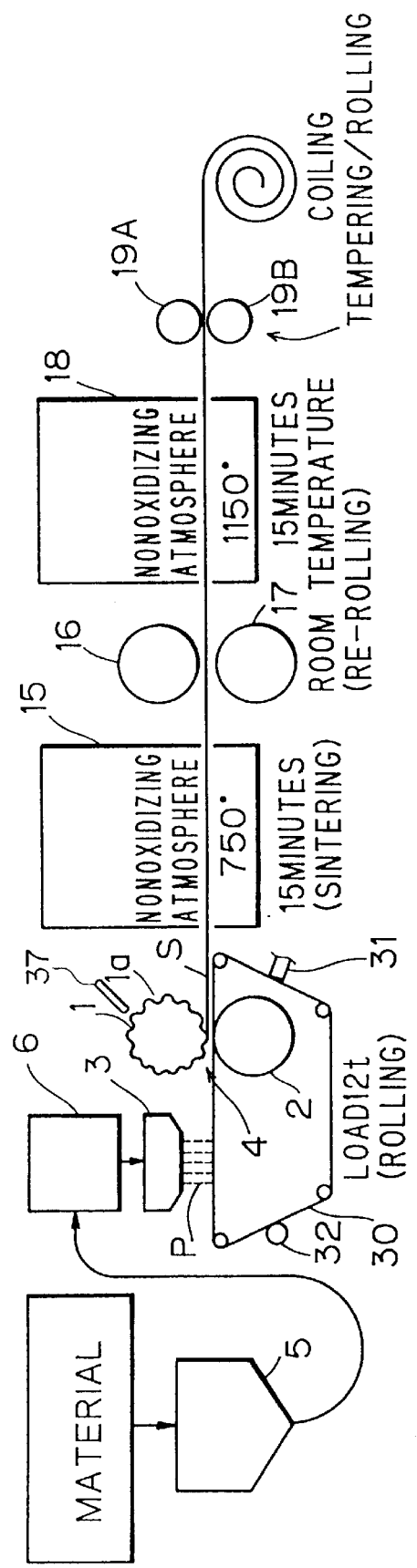
FIG. 7 is a schematic view showing an apparatus for carrying out the method of a second embodiment.

FIG. 7 shows the second embodiment of the present invention. The pattern roller 1 and the flat roller 2 are vertically provided, with an endless steel conveyor belt 30 sandwiched therebetween. The sieve 3 of the first embodiment is provided at the upstream side of the pattern roller 1 and the flat roller 2 in the feeding direction so that the sieve 3 is vibrated to supply the metal powders (P) to the upper surface of the belt 30 in a predetermined thickness.

When the metal powders (P) supplied over the belt 30 have reached the contact point (A) between the rollers 1 and 2, they enter the concaves 1a and remain on the belt 30 without being compressed by the pattern roller 1, whereas the metal powders (P) which have dropped over the peripheral surface 1b of the pattern roller 1 are compressed and rolled at a load of 12 tons by the flat roller 2. Thus, as in the case of the manner shown in FIG. 5, the metal sheet (S) formed by rolling the metal powders (P) and having the porous sheet sections 10 and the lead sections 11 is fed downstream from the contact point (A).

The metal powders (P) which are present on the concaves 1a are sucked by a suction device 31 installed on the belt 30 which is fed to the downstream side in the feeding direction of the compressed metal sheet (S). When the metal powders (P) have still attached to the belt 30, a cleaning roller 32 installed at the downstream side of the suction device 31 is brought into contact with the belt 30 to remove them therefrom. The metal powders (P) which have attached to the pattern roller 1 are removed therefrom by the suction device 31 and the knife 37. Because the metal powders (P) which have remained on the belt 30 and the pattern roller 1 are not compressed, they are recycled, similarly to the first embodiment.

The metal sheet (S) formed by the rollers 1 and 2 and fed downstream from the contact point (A) is continuously fed into the sintering oven 15 to sinter it in a nonoxidizing atmosphere at 750° C. for about 15 minutes. In the second embodiment, the metal sheet (S) was contracted by 2%–3% as a result of the sintering. After the metal sheet (S) is sintered, it is rolled as follows: It is passed through the flat rollers 16 and 17 by applying a load of 5 tons thereto to roll it again. Then, the metal sheet (S) is continuously fed into the sintering oven 18 to sinter it again in a nonoxidizing atmosphere at 1,150° C. for about 15 minutes, with the result that it was contracted by 0.5%. Thereafter, it is passed between a pair of the tempering rollers 19A and 19B to adjust the thickness of the metal sheet (S) to a predetermined thickness. Then, the metal sheet (S) is wound around a roller as a coil (C). The porous metal sheet of the second embodiment thus formed has a thickness of 28 $\mu$m and an open area ratio of 57%.

Figure 8A:
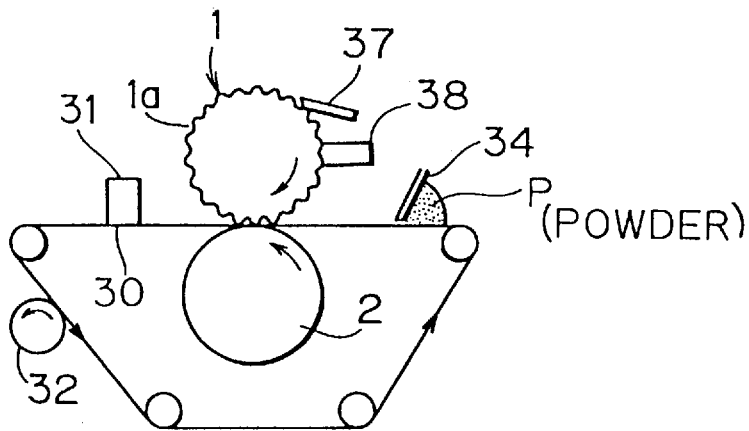
FIGS. 8 (A) through 8 (C) are schematic views showing modifications of the second embodiment of the present invention.
Figure 8B:
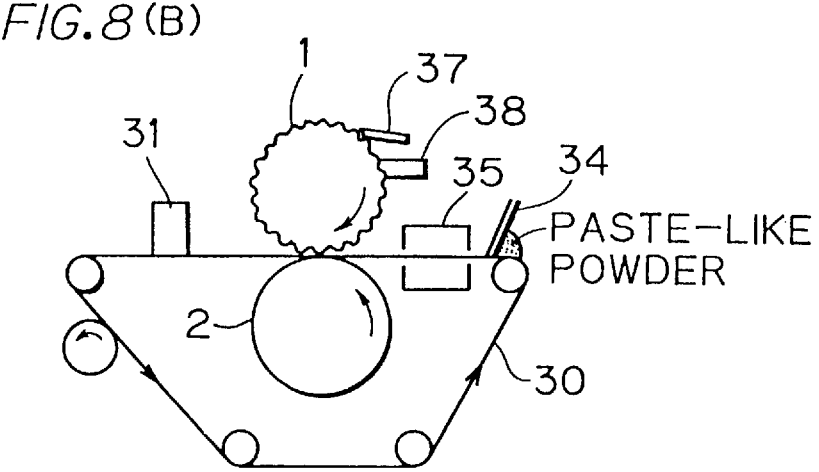
Figure 8C:
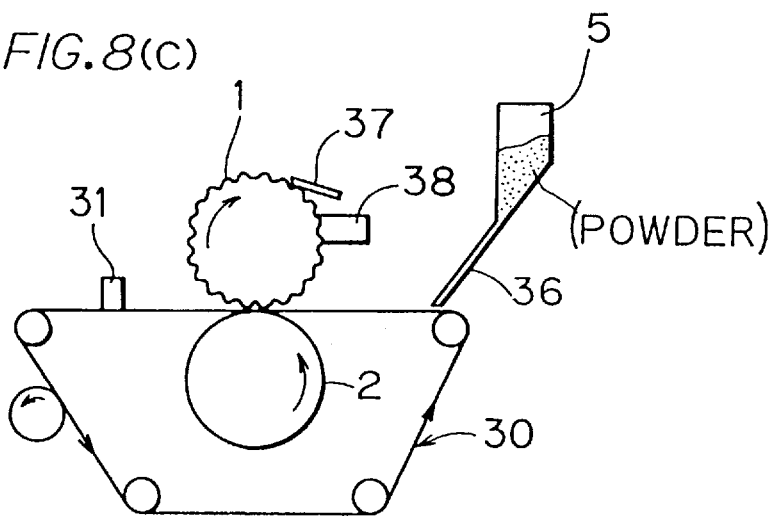
Figure 9A:
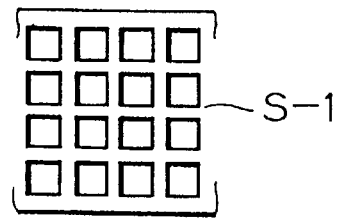
FIGS. 9 (A) through (D) are plan views showing modifications of a porous metal sheet manufactured by a method of the present invention.
Figure 9B:
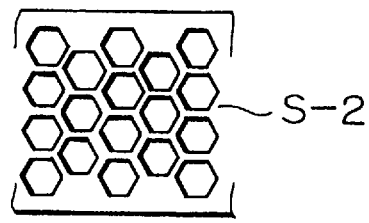
Figure 9C:
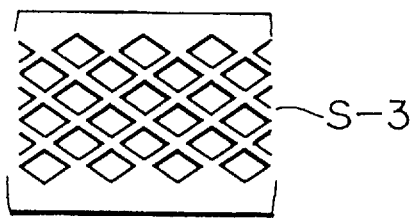
Figure 9D:
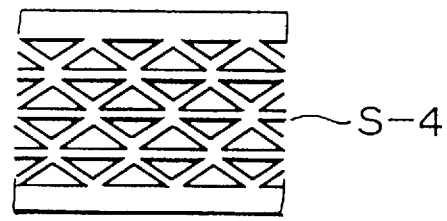

FIGS. 8 (A)–8 (C) show modifications of the method of supplying metal powders to the belt 30. As shown in FIG. 8

(A), the metal powders (P) are supplied directly to the upper surface of the belt 30 and the amount of the metal powders (P) is adjusted by a doctor knife 34 placed over the belt 30 so as to feed a constant amount thereof to the pattern roller 1. As shown in FIG. 8 (B), it is possible to supply paste-like metal powders over the belt 30; adjust the amount thereof by means of the doctor knife 34; and dry and degrease it by means of a drying means 35; and supply it to the surface of the pattern roller 1. Further, as shown in FIG. 8 (C), a conduit 36 may be connected with the take-out opening of the hopper 5 at the lower end thereof to supply the metal powders (P) from the take-out opening of the hopper 5 to the belt 30. In each of the above modifications, a knife 37 and a suction device 38 are installed over the peripheral surface of the pattern roller 1 to remove metal powders which have remained thereon.

FIGS. 9 (A)–9 (D) show metal sheets manufactured by compression and rolling, with the concaves 1a formed on the pattern roller 1 shaped into quadrangular, hexagonal, rhombic, and triangular. Pores of a porous metal sheet S-1 shown in FIG. 9 (A) form the shape of a lattice; Pores of a porous metal sheet S-2 shown in FIG. 9 (B) form the shape of a honeycomb; Pores of a porous metal sheet S-3 shown in FIG. 9 (C) form the shape of a lath; and pores of a porous metal sheet S-4 shown in FIG. 9 (D) are in the shape of triangles arranged lengthwise and widthwise. The shape of pores to be formed on the porous metal sheet can be determined according to the shape of the concaves 1a formed on the pattern roller 1. Further, the open area ratio of the porous metal sheet can be adjusted to a desired one.

The method of manufacturing the lath-shaped porous metal sheet S-3 shown in FIG. 9 (C) is described below. Using an apparatus similar to that shown in FIG. 8 (A), the concaves 1a of the pattern roller 1 are rhombic. The hopper is supplied with electrolyzed branch-shaped copper powders having diameters 10–40 μm. The copper powders are supplied to the belt 30, with the doctor knife 34 adjusting the amount thereof to a predetermined amount so as to supply them in a predetermined amount directly to the upper surface of the pattern roller 1. The copper powders are compressed by the rollers 1 and 2 at the normal room temperature at a load of 4 tons. Then, a metal sheet having pores in the shape of a lath is fed downstream, and sintered in a nonoxidizing atmosphere at 960° C. for about 10 minutes. Then, it is passed through a pair of flat rollers by applying a load of 2 tons thereto to roll and temper it again. The resulting porous metal sheet has a thickness of 20 μm, an open area ratio of 40%, and tensile force of 2.5 kgf/20 mm.

Figure 10A:
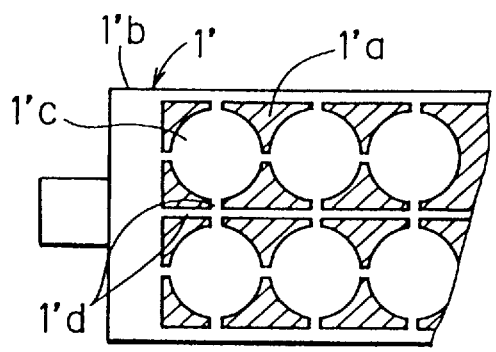
FIG. 10 (A) is a main portion-depicted plan view showing a pattern roller to be used in a third embodiment of the present invention.
Figure 10B:
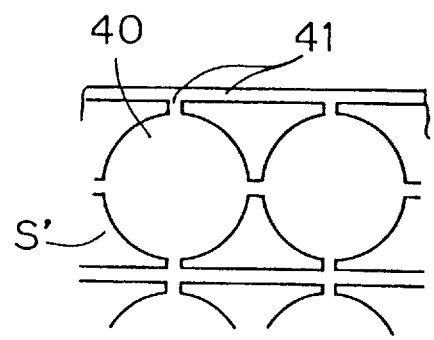
Figure 10C:
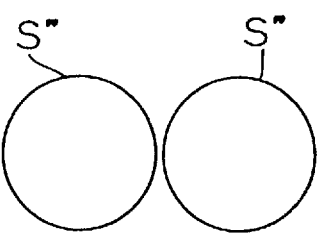

The third embodiment relates to a method of manufacturing a metal sheet having circular solid metal portions. As shown in FIG. 10 (A), a pattern roller 1' has, on its peripheral surface, a circular portion 1'c having a required shape; a concave portion 1'a shown by oblique lines; and a connection portion 1'd connecting the circular portions 1'c with each other.

Using the pattern roller 1', metal powders are dropped to the concave portion 1'a, and metal powders on the circular portion 1'c and the connection portion 1'd are compressed. As a result, a metal sheet S' having a circular solid metal portion 40 connected with a connection portion 41 is formed. Similarly to the first and second embodiments, the metal sheet S' is sintered and rolled by tempering rollers. The metal sheet S' manufactured by rolling and sintering is cut at the connection portion 41 thereof to provide a metal sheet S" to be used as component parts of a circular battery, as shown in FIG. 10 (C).

FIG. 11 shows a metal sheet S' manufactured as a modification of the metal sheet of the third embodiment by a method similar to that of the third embodiment. In the metal sheet S', rectangular portions shown by oblique lines in FIG. 11 (A) are unrequired portions 45, and portions other than the unrequired portions 45 are cut as shown by one-dot chain line of FIG. 11 (A) to provide a metal sheet S" to be used as an L-shaped lead of a battery consisting of a solid metal portion shown in FIG. 11 (B).

In the third embodiment shown in FIGS. 10 and the modification shown in FIG. 11, the portions to be cut off from a material metal sheet is formed as pores on the pattern roller. Thus, a material can be used without wasting a large amount of metal. Further, the metal sheet consisting of the solid portion can be allowed to be thin as desired. The metal sheet consisting of the solid portion can be preferably used in addition to component parts of a battery.

In the first through third embodiments, after metal powders are rolled by means of the rollers 1 and 2 at the normal room temperature, the resulting metal sheet is sintered in the sintering oven 15; the sintered metal sheet is rolled again by the flat rollers 16 and 17; the rolled sheet is sintered again by the sintering oven 18. Metal powders of Au, Ag, Sn, Pb, In, and C are not required to be sintered, but may be only rolled.

As described above, in the process of manufacturing the porous metal sheet (S) or the metal sheet S' having the solid portion are formed by rolling metal powders at the normal room temperature by means of the pattern roller 1 and the flat roller 2. In addition, the metal sheet (S) or the metal sheet S' can be formed in various processes depending on the kind of metal powders.

That is, thin metal sheets can be processed from metal powders in appropriate combinations of the following six processes.

1) Rolling by means of rollers comprising a pattern roller.
2) Rolling by means of rollers including a heated pattern roller
3) Re-rolling by means of a flat roller
4) Re-rolling by means of a heated flat roller
5) Sintering in a sintering oven
6) Tempered rolling by means of flat rollers In the rolling to be carried out by the roller having the heated pattern roller of the process (2), at least the pattern roller 1 is heated to 300° C.–400° C. previously and a predetermined amount of metal powders is supplied to the upper surface of the pattern roller 1, similarly to the first through third embodiments. In this case, the metal powders are rolled at the portion (A) of contact between the pattern roller 1 and the flat roller 2 at a load of 7 tons to form a metal sheet. Instead of heating the pattern roller 1 itself, the temperature of the atmosphere in which the roller is provided may be heated to 300° C.–400° C. Further, the surface of the pattern roller may be heated to a high temperature.

Figure 12:
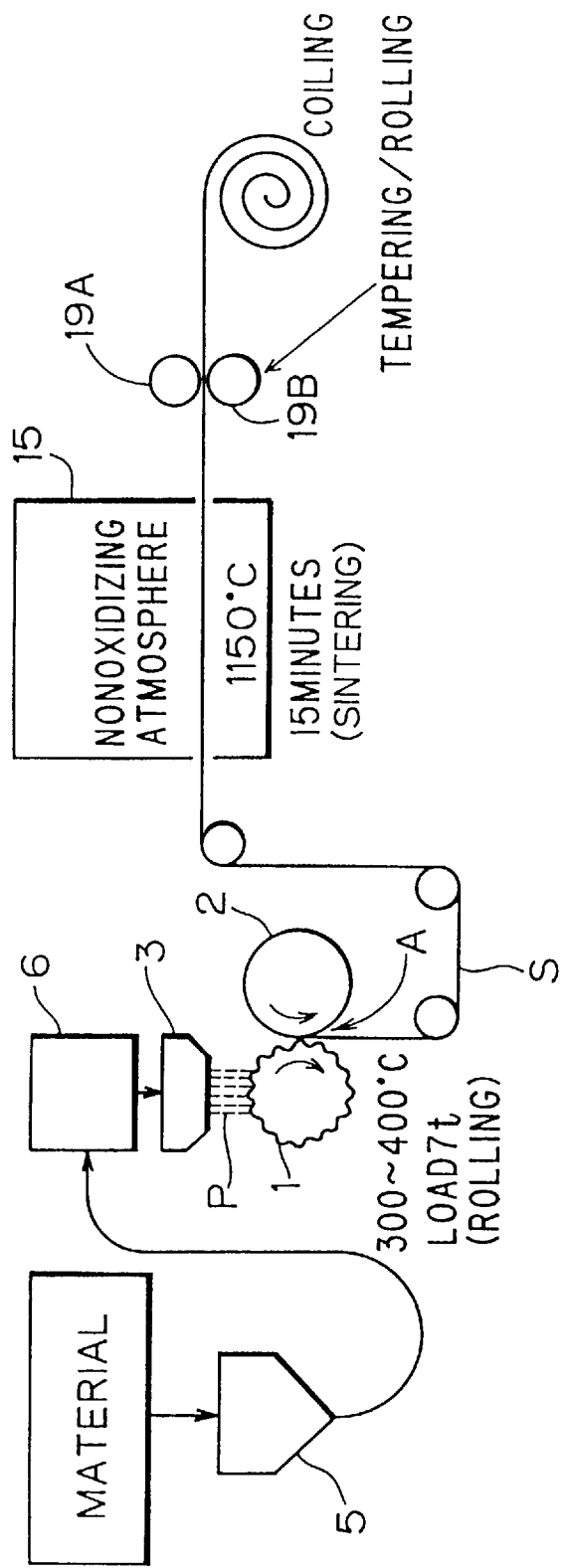
FIG. 12 is a schematic view showing an apparatus for carrying out a method of the present invention.
Figure 13A:
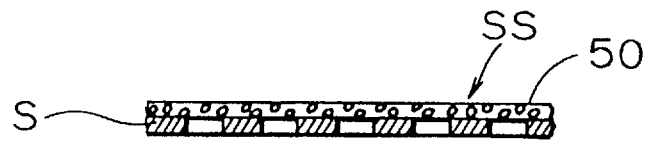
FIGS. 13 (A) through 13 (G) are schematic sectional views showing metal sheets manufactured by a manufacturing method of a fourth embodiment of the present invention.
Figure 13B:
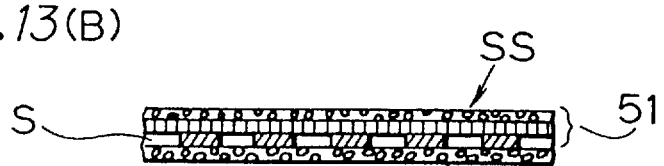
Figure 13C:
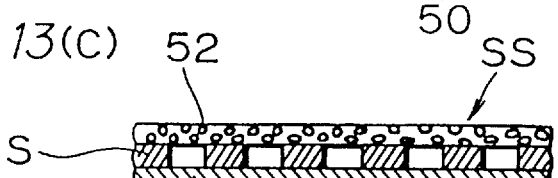
Figure 13D:
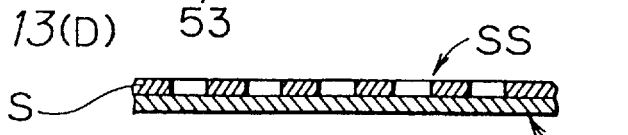
Figure 13E:
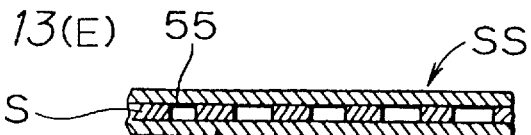
Figure 13F:
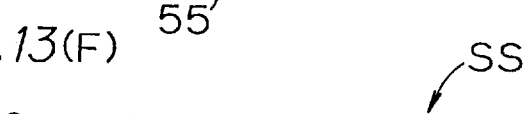
Figure 13G:
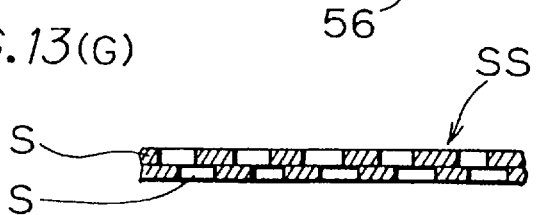

When the heated pattern roller 1 is used, a metal sheet may be manufactured by only rolling metal powders. Otherwise, as shown in FIG. 12, the metal sheet is sintered in a nonoxidizing atmosphere at 1,150° C. for about 15 minutes, and tempered by the tempering rollers 19A and 19B to manufacture a porous metal sheet. The resulting porous metal sheet has a thickness of 34 μm and an open area ratio of 57%.

The combination of the processes (1)–(6) for manufacturing the porous metal sheet is as shown below.

(a) Process (1) or process (2)

(b) Process (3), (4), (5) or (6) is carried out subsequently to process (1) or (2). For example, (1)+(3), (2)+(4), (1)+(6), (2)+(6), and the like.

(c) Process (3) or (4) is carried out subsequently to process (1) or (2), and then, process (5) or (6) is carried out. For example, (1)+(3)+(5), (2)+(3)+(6), (1)+(4)+(5), and the like.

(d) Process (3) or (4) is carried out subsequently to process (1) or (2), and then, processes (5) and (6) are carried out sequentially. For example, (1)+(3)+(5)+(6), (2)+(4)+(5) +(6), and the like.

(e) Process (3) or (4) is carried out subsequently to process (1) or (2), and then, process (5) is carried out. Finally, process (3) or (4) is carried out. For example, (1)+(3)+(5) +(4), (2)+(3)+(5)+(3), and the like.

(f) Process (3) or (4) is carried out subsequently to process (1) or (2), and then, process (5) is carried out. Then, process (3) or (4) is carried out. Finally, process (5) or (6) is carried out. For example, (1)+(3)+(5)+(4)+(5), (2)+(4)+(5)+(3) +(6), and the like.

(g) Process (3) or (4) is carried out subsequently to process (1) or (2), and then, process (5) is carried out. Then, process (3) or (4) is carried out. Thereafter, processes (5) and (6) are carried out sequentially. For example, (1)+(3)+(5) +(4)+(5)+(6), (2)+(4)+(5)+(3)+(5)+(6), and the like.

FIGS. 13 (A)–13 (G) show metal sheets (SS) manufactured by the method according to the fourth embodiment. The metal sheets (SS) are formed by layering one or more sheets or two or more kinds of those sheets described below on one or both surfaces of the porous metal sheet (S) manufactured by the method of the first or second embodiment and then, by plating, evaporating or bonding the layered a sheet or sheets so as to integrate them with the porous metal sheet (S):

(1) The porous metal sheet (S) manufactured by the method of the first or second embodiment; That is, the porous metal sheets (S) are layered on each other.

(2) Porous metal sheets manufactured by methods other than those of the present invention; That is, a plurality of porous metal sheets formed according to the inventions filed previously by the present applicant are appropriately used.

(3) Solid metal plates or solid metal foils;

(4) Metal plates or metal foils having a large number of pores formed thereon;

(5) Three-dimensional reticulate foamed sheets made of such as sponge, porous fibrous resin or mesh sheets:

A metal sheet (SS) having a layered structure shown in FIG. 13 is described below. Before obtaining a three-dimensional reticulate porous metal sheet 50, a sheet of polyurethane sponge is bonded to one surface of the porous metal sheet (S) with adhesive agent. Then, the sheet of polyurethane sponge and the porous metal sheet (S) integrated therewith are plated and then, heated for resin removal and sintering to process the polyurethane sponge into the three-dimensional reticulate porous metal sheet 50 integrated with the metal sheet (S).

It is possible to laminate, on one surface of the porous metal sheet (S), the three-dimensional reticulate porous metal sheet 50 formed by plating and heating the three-dimensional reticulate foamed sheet of polyurethane sponge for resin removal and sintering, and then plating the layered sheet of the three-dimensional reticulate porous metal sheet 50 and the porous metal sheet (S) to integrate both sheets with each other. Instead of the three-dimensional reticulate resin sheet, needless to say, it is possible to use porous metal sheets formed by plating sheets described below and baking them for resin removal and sintering: Porous fibrous organic sheets made of synthetic resin, natural fiber, cellulose or paper having the shape of such as fabric, knit, nonwoven fabric, felt, screen, expanded, lath, punched pores-like; organic mesh sheets made of synthetic resin, natural fiber, cellulose or paper; inorganic sheets made of such as metal, glass, carbon or the like.

In particular, preferably, sheets of polyurethane sponge are bonded to both surfaces of the metal sheet (S), and then, the metal sheet (S) and the two sheets of polyurethane sponge sandwiching it therebetween is plated. In this manner, the three-dimensional reticulate porous metal sheet 50 is layered on both surfaces of the metal sheet (S). That is, because the metal sheet (S) having a high electric conductivity is positioned between the two sheets of polyurethane sponge, the electric conductivity becomes higher from both upper and lower surfaces toward the center thereof. Therefore, the two sheets of polyurethane sponge can be plated sufficiently into the interior in the thickness direction thereof unlike the conventional art.

Further, the porous metal sheet having the layered structure thus formed has a high strength because the metal sheet (S) is positioned at the center thereof. Thus, it has a high pulling strength, thus allowing an active substance to be applied thereto at a high speed. It is difficult to allow the porous metal sheet to have a high strength in increasing the open area ratio thereof when the amount of metal per area to be applied to polyurethane sponge is reduced and the diameters of skeletons surrounding pores are reduced. But it is possible to allow the porous metal sheet to have a required strength because the metal sheet (S) formed by rolling metal powders has a high strength. When the mesh sheet used in place of the metal sheet (S) and polyurethane sponge are layered on each other, it is necessary to plate in an amount more than 300 g/m$^2$ to the polyurethane sponge. But in layering the metal sheet (S) and the polyurethane sponge on each other, it is possible to reduce the amount of plating metal to be applied to the polyurethane sponge to 200 g/m$^2$. Thus, the open area ratio of the porous metal sheet can be increased.

In forming the plated metal sheet (SS) comprising polyurethane sponge sheets bonded to both surfaces of the metal sheet (S), it is possible to differentiate the diameter of pores of one polyurethane sponge sheet to be bonded to one surface of the metal sheet (S) and that of the other sheet to be bonded to the other surface thereof. The active substance-applied metal sheet (SS) having such a structure can be used as a high-quality electrode plate of a cylindrical battery, by coiling it, with the larger diameter-pore positioned at the peripheral side and with the smaller diameter-pore positioned at the inner peripheral side. In such an electrode plate, the active substance is not removed easily from the metal sheet (SS), and the metal sheet (SS) is not cracked easily.

In a metal sheet (SS) shown in FIG. 13 (B), a three-dimensional reticulate foamed sheet made of polyurethane sponge and a mesh sheet made of resin are layered on one surface of the porous metal sheet (S) formed by rolling metal powders by means of the pattern roller of the first embodiment, and a three-dimensional reticulate foamed sheet made of polyurethane sponge is layered on the other surface thereof. Then, the four sheets layered on each other are plated. That is, the metal sheet (SS) comprises the metal sheet (S), a porous metal sheet 51 consisting of a three-dimensional reticulate porous metal sheet and a metal mesh sheet positioned on-one surface of the metal sheet (S), and the three-dimensional reticulate porous metal sheet 50 positioned on the other surface thereof, with the four sheets layered on each other.

A metal sheet (SS) shown in FIG. 13 (C) is formed as follows: metal powders are attached to the surface of a sheet made of a three-dimensional reticulate foamed sheet made of polyurethane sponge and the sheet is baked for resin removal and sintering to form a porous metal sheet 52. Similarly, metal powders are attached to a nonwoven sheet, and the sheet is baked for resin removal and sintering to form a porous metal sheet 53. The porous metal sheet 52 is layered on one surface of the porous metal sheet (S) formed by rolling metal powders with the pattern roller of the first embodiment, and the porous metal sheet 53 is layered on the other surface thereof. Then, the layered sheets are plated to form the metal sheet (SS) consisting of the three sheets integrated with each other. As the metal powders, ultra-fine metal ones flake-shaped ones and/or metal powders crushed can be preferably used.

In the above-described manner, metal powders are attached to each of the three-dimensional reticulate foamed sheet made of polyurethane sponge and the nonwoven sheet, and then, the two sheets are baked for resin removal and sintering to form the porous metal sheet, and then, each porous metal sheet is layered on the porous metal sheet (S). Instead, the metal sheet (SS) can be formed as follows: The three-dimensional reticulate foamed sheet is layered on one surface of the metal sheet (S), and the nonwoven sheet is layered on the other surface thereof and then, the metal powders are attached to both the three-dimensional reticulate foamed sheet and the nonwoven sheet, and then, the three sheets layered on each other are baked for resin removal and sintering to form a layered sheet comprising the metal sheet (S), the three-dimensional reticulate porous metal sheet, and the nonwoven sheet-like porous metal sheet. Further, the porous metal sheet consisting of the three sheets layered on each other may be electroplated again.

A metal sheet (SS) shown in FIG. 13 (D) having a layered structure is formed as follows. That is, a nonwoven sheet is layered on one surface of the porous metal sheet (S) formed by the first embodiment, and then the nonwoven sheet is coated with sprayed melted metal. Then, the two sheets layered one on the other are baked for resin removal and sintering. The porous metal sheet (S) and the nonwoven sheet-like porous metal sheet 54 layered thereon are plated to form the metal sheet (SS) consisting of the two sheets integrated with each other. In forming the metal sheet (SS) in the above-described method, it is possible to use a three-dimensional reticulate sheet, porous fibrous sheet or a mesh sheet, instead of the nonwoven sheet.

A metal sheet (SS) having a layered structure shown in FIG. 13 (E) is formed as follows: A nonwoven fabric-like porous metal sheet 55 formed of metal fibers consisting of metal powders is layered on both surfaces of the porous metal sheet (S) formed by the first embodiment. Then, the three sheets layered on each other as described above are plated. Instead of metal fibers made of metal powder, it is possible to use a nonwoven fabric-like porous metal sheet consisting of metal fibers formed by a convergent drawing method, or metal fiber spinning method, metal foil cutting method. Further, it is possible to use a nonwoven fabric-like porous metal sheet consisting of metal fibers formed by cutting a metal rod or a coiled metal foil by chatter vibration cutting method. The metal sheet (SS) consisting of the nonwoven fabric-like porous metal sheet 55 consisting of fine or small-diameter metal fibers and the metal sheet (S) formed by the first embodiment and layered thereon has a high strength and a high open area ratio. Further, because the metal sheet (S) has a high strength and a high electric conductivity, the layered metal sheet (SS) has a high electric conductivity. Therefore, the metal sheet (SS) has a high open area ratio and moreover, has a high pulling strength.

A metal sheet (SS) having a layered structure shown in FIG. 13 (F) is formed as follows: Through the intermediary of a screen, slurry-like fine metal powders are applied to a base film. Then, the base film is baked, treated with chemicals or exfoliate to remove it from the fine metal powders. Then, the metal powders are sintered to form a porous metal sheet 56. Then, the porous metal sheet 56 is layered on one surface of the porous metal sheet (S) formed by the first embodiment. Then, the porous metal sheet (S) and the porous metal sheet 56 layered thereon are plated to form the metal sheet (SS).

A metal sheet (SS) having a layered structure shown in FIG. 13 (G) is formed as follows: Two porous metal sheets (S) formed by the first embodiment are layered on each other and are then plated.

As porous metal sheets to be layered on and integrated with the porous metal sheet (S) formed by the first embodiment, it is possible to use a porous metal sheet having a large number of pores formed thereon by performing punching processing, lath processing or expanded processing on a metal plate or a metal foil, a solid metal plate, a solid metal foil, a metal mesh sheet, a metal screen or a porous metal sheet formed by electro-coating them by using coating including metal powders, and then baking them for resin removal and sintering; a porous metal sheet formed by applying metal powders to a three-dimensional reticulate sheet by using adhesive agent and baking the sheet for resin removal and sintering; or a porous metal sheet formed by forming an electrically conductive metal layer consisting of fine metal powders applied to a three-dimensional reticulate sheet by using adhesive agent and then plating the sheet and then baking the sheet for resin removal and sintering. In addition, it is possible to laminate a tab-provided porous metal sheet on the porous metal sheet (S) formed by rolling metal powders by means of the pattern roller and integrate both sheets with each other in such a manner that the tab is layered on the solid metal portion of the porous metal sheet (S).

In forming the metal sheet consisting of the metal sheet (S) and two same three-dimensional reticulate porous metal sheets by bonding sheets of polyurethane sponge to both surfaces of the metal sheet (S), and then, plating the metal sheet (S) and the two sheets of polyurethane sponge or by plating the sheets of polyurethane sponge and then layering each plated sheet on each surface of the metal sheet (S), it is possible to differentiate the pulling strengths of both three-dimensional reticulate porous metal sheets from each other by altering the diameter of pores thereof, the open area ratio thereof, and the thickness of skeleton surrounding the open area. The same is the case with nonwoven fabric-like porous metal sheets which are bonded to both surface of the metal sheet (S).

When the metal sheet having the layered structure and an active substance applied thereto is spirally coiled to use it as the electrode plate of a battery, it is preferable to position the three-dimensional reticulate porous metal sheet having the larger diameter-pore at the outer peripheral side and the one having the smaller diameter-pore at the inner peripheral side so that the outer side of the metal sheet can be stretched in coiling it and consequently, the occurrence of crack can be reduced or prevented.

Evaporation, fusing or any appropriate method can be used in addition to plating as the method of integrating the metal sheet (S) formed by rolling metal powders by means of the pattern roller with various kinds of porous metal sheets, various kinds of metal plates or various kinds of metal foils.

The porous metal sheet formed by the above-mentioned methods is cut to required sizes and an active substance is applied thereto to use them as the electrode plate of a nickel hydrogen battery, a nickel cadmium battery or the like. Because the electrode plate of the present invention is thinner than the conventional one, it can be accommodated in a battery in an amount more than the conventional one, thus improving the capability thereof. Further, the open area ratio of the electrode substrate can be adjusted as desired. Furthermore, the open area ratio of the substrate can be increased without wasting a material and thus the substrate can be manufactured at a low cost.

In addition, a solid metal plate or a solid metal foil may be fused into one surface or both surfaces of the metal sheet of the first or second embodiment to form a metal sheet having a layered structure. In addition, a metal sheet having a layered structure may be manufactured by plating the solid metal plate or the solid metal foil layered on one surface or both surfaces of the metal sheet of the first or second embodiment. The metal sheet consisting of the solid metal plate or foil layered on the metal sheet of the first or second embodiment can be used as the electrode substrate of a lithium secondary battery.

As apparent from the foregoing description, according to the manufacturing method of the present invention, concaves of a required pattern are formed on the pattern roller of a pair of rollers. In supplying metal powders to the pattern roller, those which have dropped to the concaves are not rolled but those which have dropped to the concave-unprovided portion of the peripheral surface of the pattern roller are compressed. Then, a metal sheet formed of metal powders is rolled, sintered, repeatedly, then tempered as necessary. In this manner, a porous metal sheet having pores having a required shape formed thereon is manufactured.

The porous metal sheet obtained by the method is thinner than the one obtained by the conventional method of punching a metal sheet to form pores thereon. When the porous metal sheet is used as an electrode substrate, the amount of metal powders to be used for a material per centiare can be reduced because the porous metal sheet is thin. Thus, the porous metal sheet can be manufactured at a low cost. In addition, the porous metal sheet can be accommodated in a battery in an amount more than the conventional one, thus improving the capability thereof.

Furthermore, because the porous metal sheet consists of metal powders, it has a high electrical conductivity. Thus, when it is used as an electrode plate, it improves the capability of a battery. Because the porous metal sheet has a high pulling strength, the manufacturing line thereof can be operated at a high speed. Therefore, the porous metal sheet can be produced at a high efficiency and thus at a low cost.

Further, the method of the present invention eliminates the need for the provision of a punching process and a plating process required in manufacturing a punching metal, thus allowing the porous metal sheet to be manufactured in a simple process and hence at a low cost. Moreover, metal powders which have dropped to the concaves of the peripheral surface of the pattern roller are not compressed by the flat roller, thus being recycled without wasting metal powders, which leads to the reduction in manufacturing cost.

Further, because metal is used in the form of powder, they can be compresses and united each other under pressure at a temperature lower than the melting point of a metal even though the melting point is high. In addition, mixed with other kinds of metals. Accordingly, a porous metal sheet or a solid metal sheet can be obtained from a required kind of metal, the oxide thereof, the sulfide thereof, a simple substrate containing a compound of the metal or a mixture thereof.

Because the metal sheet obtained by rolling metal powders by means of a pair of the rollers including the pattern roller is thin, the thickness thereof can be adjusted to a required one even though the metal sheet and porous metal sheets are layered on each other. Thus, in a layered metal sheet, the metal sheet of the present invention can be preferably used. When three-dimensional reticulate porous metal sheets or nonwoven fabric-like porous metal sheets are layered on the metal sheet manufactured by using the pattern roller with the metal sheet sandwiched therebetween, the entire sheet thus formed has a high strength because the metal sheet having a high pulling strength is positioned at the center thereof. Thus, it has a high pulling strength, thus allowing an active substance to be applied thereto at a high speed.

Further, in a layered structure consisting of foamed sheets of polyurethane sponge or the like, porous fibrous sheets of resin or mesh sheets layered on both surfaces of the metal sheet manufactured by using the pattern roller are plated, the electric conductivity from the peripheral side of the entire sheet toward the center thereof is allowed to be favorable. Thus, the foamed sheets or the mesh sheets can be plated into the interior in the thickness direction thereof. That is, the entire metal sheet having the layered structure has a high electrical conductivity, thus increasing the performance of a battery when an active substance-applied metal sheet is used as an electrode plate of the battery.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a porous metal sheet having pores forming a pattern, comprising the steps of:

supplying metal powders to a peripheral surface, of at least one pattern roller of a pair of rollers, on which a pattern including a large number of concaves is formed;

dropping metal powders into the concaves and accumulating metal powders on a peripheral surface of the pattern roller except in the concaves; and rolling directly the metal powders accumulated on the peripheral surface of the pattern roller except in the concaves by rotating the pair of rollers.

2. The method according to claim 1, wherein the pattern roller has a portion of a required shape in which the concaves are not formed so as to manufacture a porous metal sheet having a metal solid portion having the required shape.

3. The method according to claim 1, wherein at least one of the pair of the rollers is heated previously, and metal powders are rolled on the heated roller.

4. The method according to claim 1, wherein after the metal powders are rolled by the pair of rollers including the pattern roller, the metal powders are rolled again by a pair of flat rollers having a smooth peripheral surface.

5. The method according to claim 4, wherein pair of flat rollers are heated.

6. The method according to claim 1, wherein the metal powders are sintered after the metal powders are rolled by the pair of rollers including the pattern roller.

7. The method according to claim 4, wherein the metal powders are sintered after the metal powders are rolled by the pair of flat rollers.

8. The method according to claim 6, wherein the metal powders are rolled again by the pair of flat rollers having a smooth peripheral surface after the metal powders are sintered.

9. The method according to claim 7, wherein the metal powders are rolled again by the pair of flat rollers having a smooth peripheral surface after the metal powders are sintered.

10. The method according to claim 1, after the porous metal sheet manufactured, at least one surface of the metal sheet manufactured is layered by, one or more of the metal sheet, a porous metal sheet, a solid metal sheet, a solid metal foil, a metal sheet or a metal foil each having a large number of pores formed thereon, a metal mesh sheet, a metal screen, a three-dimensional reticulate foamed sheet, a porous fibrous resin sheet, a mesh sheet, and/or a porous metal sheet which is manufactured by baking the sheet to remove resin and sintering after plating, evaporating, coating fine metal on powders or spray-coating melted metal a three-dimensional reticulated foamed sheet, a porous fibrous resin sheet, a mesh sheet, a sheet composed by layering those sheets on each other or two or more kinds of those sheets.

11. A metal sheet manufactured by the method described in claim 1.

12. A metal sheet manufactured by the method described in claim 10.

13. A metal sheet of an electrode substrate of a battery manufactured by the method described in claim 1.

14. A metal sheet of an electrode substrate of a battery manufactured by the method described in claim 10. lace-shaped.

15. The metal sheet according to claim 11, wherein the metal powders constituting the metal sheet are selected from the group consisting of Ni, Al, Cu, Fe, Ag, Zn, Sn, Pb, Sb, Ti, In, V, Cr, Co, C, Ca, Mo, Au, P, W, Rh, the oxide thereof, the sulfide thereof, the compounds thereof and a mixture of those metals.

16. The metal sheet according to claim 11, wherein the metal sheet having pores forming a pattern is punched pore-shaped, reticulate, honeycomb-shaped, lath-shaped, lattice-shaped, expanded-shaped, screen-shaped or lace-shaped.

17. The metal sheet according to claim 11, wherein the metal sheet has a lead portion, in which pores are formed not at regular intervals.

18. The metal sheet according to claim 12, wherein a three-dimensional reticulate porous metal sheet or a porous fibrous metal sheet is layered on both surfaces of the metal sheet manufactured by the pattern roller; the metal sheet is sandwiched between the two three-dimensional reticulate porous metal sheets or between the two porous fibrous metal sheets; and a diameter of a pore, an open area ratio, and/or a diameter of a metal fiber of the three-dimensional reticulate porous metal sheet or those of the porous fibrous metal sheet layered on one surface of the metal sheet are different from those of the three-dimensional reticulate porous metal sheet or those of the porous fibrous metal sheet layered on the other surface thereof.

19. A battery comprising the metal sheet described in claim 11 used as an electrode substrate.

20. A roller having a pattern roller having concaves formed thereon which do not extend to edges of the pattern roller and used in the manufacturing method described in claim 1.

* * * * *